United States Patent [19]
Tan

[11] Patent Number: 5,897,324
[45] Date of Patent: Apr. 27, 1999

[54] MULTIMEDIA-BOOK OPERABLE WITH REMOVABLE DATA STORAGE MEDIA IMPLEMENTED WITH UNIVERSAL INTERFACING BOOK-ADAPTING PROCESSOR

[75] Inventor: Hsiao-Hu Tan, Hsinchu, Taiwan

[73] Assignee: ATOP Technologies, Inc., Hsinchu, Taiwan

[21] Appl. No.: 08/794,035

[22] Filed: Feb. 3, 1997

[51] Int. Cl.[6] ...................................................... G09B 5/06
[52] U.S. Cl. .......................... 434/317; 345/901; 704/258; 462/66; 434/307 R; 434/365; 434/169
[58] Field of Search ..................................... 345/901, 978; 434/307 R, 317, 169, 185, 362, 365; 704/258, 270, 200; 462/55, 66, 71

[56] References Cited

U.S. PATENT DOCUMENTS

| | | | |
|---|---|---|---|
| 4,538,224 | 8/1985 | Peterson | 345/901 |
| 5,142,536 | 8/1992 | Akao et al. | 395/183.07 |
| 5,475,399 | 12/1995 | Borsuk | 345/130 |
| 5,484,292 | 1/1996 | McTaggart | 434/317 |
| 5,534,888 | 7/1996 | Lebby et al. | 345/121 |
| 5,624,265 | 4/1997 | Redford et al. | 434/307 R |
| 5,645,432 | 7/1997 | Jessop | 434/322 |
| 5,661,635 | 8/1997 | Huffman | 361/684 |
| 5,739,814 | 4/1998 | Ohara | 345/173 |

OTHER PUBLICATIONS

IEEE Standard Dictionary of Electrical and Electronics Terms [IEEE Std 100–1996 (Dec. 1996).

Primary Examiner—David R. Hudspeth
Assistant Examiner—Donald L. Storm
Attorney, Agent, or Firm—Bo-In Lin

[57] ABSTRACT

An universal multimedia book interfacing device is disclosed in this invention. This device is used for operation with a multimedia book. The interfacing device includes a first adapting connector provided with connection compatibility for electrically connecting to several different multimedia books. Each multimedia book is provided with user interfaces for accepting user input signals therein and delivering user output signals therefrom. The universal interfacing device further includes a second adapting device provided with connection compatibility for electrically connecting to a data storage containing data relating to the multimedia books. The universal interfacing device is provided for electrically transmitting the user input signals received from one of the multimedia books to predesignated locations in the data storage for generating user output signals and for electrically transmitting the user output signals to the multimedia books. In one of the preferred embodiment, the first adapting connector is a multimedia book cartridge provided with adapting compatibility to receive different multimedia books therein.

22 Claims, 3 Drawing Sheets

MULTIMEDIA-BOOK OPERABLE WITH REMOVABLE DATA STORAGE MEDIA IMPLEMENTED WITH UNIVERSAL INTERFACING BOOK-ADAPTING PROCESSOR

BACKGROUND OF THE INVENTION

1. Field of the Invention

This invention relates generally to application of information printed on pages of a book and circuit elements placed thereon for the purposes of generating user input and corresponding output by adapting the book to an electronic data processing module. More particularly, this invention relates to an universal book adapting processing system for interfacing with multimedia books such that the multimedia books can be flexibly operated with removable data-storage media without requiring a book-specific electronic module whereby the cost of using multimedia books for learning and teaching enhancement can be reduced while the quality and performance of the multimedia book operations can be improved.

2. Description of the Prior Art

The "show-and-tell" types of "electronic books" currently available in the marketplace by taking advantage of the data processing capabilities of electronic modules are still limited by the difficulties that each book is adapted to a specific data-processing module suitable only for that book. The book-specific data-processing module is specially designed and manufactured uniquely for a pre-designated book to be adapted thereon. On the one hand, the application of such book is more expensive due the requirement that each book has to be adapted to a customized electronic module. On the other hand, in order to maintain reasonable price such that these "electronic books" in combination with the customized electronic module are marketable, the data-processing module and the circuit elements formed on the pages of the book are generally manufactured with cheap and simple processes. Therefore, limited by the cost constraints, the quality, performance and sophistication levels of functions provided in these "electronic books" are at the very low end when compared with what are achievable by current integrate circuit (IC) and multimedia data processing technology.

A typical "electronic book" 10 for learning or teaching enhancement, generally applied for children education, is shown in FIG. 1. This conventional "electronic book" includes a plurality of wired pages 15. Each of these wired pages includes printed illustrations 20, such as foods, animals, or daily items for which the pronunciations of those item's names are to be learned by a child. Next to each printed illustration 20 is a push button 25 which is connected by an electric wire 30 to a book's electronic module 40. When a child pushes the button next to an illustration showing a specific item, a signal, i.e., an address is transmitted via the wire 20 to the book's electronic module 40. The address signal generated by the child's action in pushing the button is transmitted to the book's electronic module 40 to initiate an audio output generated from a specific memory address depending on the page number and the button 25 pushed by the child. The audio output generated by the book's electronic module is the pronouncement of the name of the drawing 20 next to the button 25 pushed by the child thus allowing an interactive learning process to be carried out between the child and the "electronic book". Due to the limitation of the configuration employed by the conventional electronic book-10, each book is attached to a specific electronic module. The cost for manufacturing such electronic book for learning enhancement cannot be easily reduced. However, in order to lower the production cost of these "electronic books" to make them more marketable, the electric wires 30 and the book's electronic module 40 are made with simple and cheap materials and processes. The quality of the audio output and the features of functions performed by the electronic books are therefore limited by the price constraints.

Therefore, a need still exists in the art of designing and manufacturing the electronic books to provide better system configuration and method of interfacing the content presented on a multimedia book to a data-processing module such that the difficulties and limitations as encountered by those electronic book in the prior art can be resolved. It is desirable that the system configuration and method of interface can provide broader interfacing capabilities and greater degree of freedom whereby a user can moire conveniently and flexibly apply the improved system for learning enhancement without significantly increasing system costs.

SUMMARY OF THE PRESENT INVENTION

It is therefore an object of the present invention to provide an improved system configuration and interfacing method for adapting a multimedia book to a data-processing module which allow more user selections and interfacing flexibility such that the aforementioned difficulties and limitations in the prior art can be overcome.

Specifically, it is an object of the present invention to provide an improved system configuration and interfacing method for adapting a multimedia book to a data-processing module by applying an universal multimedia book adapting module which allows different multimedia books to be adapted thereon thus the limitations caused by a book-specific electronic module can now be resolved.

Another object of the present invention is to provide an improved system configuration and interfacing method for adapting a multimedia book to a data-processing module wherein the data-processing module is provided to employing a varieties of data-storage media to store therein corresponding to different sets of multimedia books thus allowing broader spectrum of multimedia books to be selected by a user without being limited by a book-specific electronic module of the prior art.

Another object of the present invention is to provide an improved system configuration and interfacing method for adapting a multimedia book to a data-processing module which allow moire user selections and interfacing flexibility such that the cost of employing this multimedia book system for learning enhancement can be reduced because a single system can now be applied to different multimedia books.

Another object of the present invention is to provide an improved system configuration and interfacing method for adapting a multimedia book to a data-processing module which allow more user selections and interfacing flexibility such that the quality and performance of such systems can be improved because a single system can now be applied to different multimedia books and therefore a higher-price higher-quality unit is acceptable to the market because of the higher level of utilities.

Briefly, in a preferred embodiment, the present invention includes an universal multimedia book interfacing means for correlating a multimedia book to a data storage and processing means. The interfacing means includes a first adapting means provided with connection compatibility for electrically connecting to different multimedia books. Each multimedia book is provided with user interfaces for accepting user input signals therein and generating user output signals therefrom. The universal interfacing means further includes a second adapting means provided with connection compatibility for electrically connecting to a data storage means containing data relating to the multimedia books wherein the universal interfacing means is provided for electrically transmitting the user input signals received from one of the multimedia books to pre-designated locations in the data storage means for generating user output signals and for electrically transmitting the user output signals to the multimedia books. In one of the preferred embodiment, the first adapting means is a multimedia book cartridge provided with adapting compatibility to receive different multimedia books therein.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIGS. 5A and 51B show two perspective views of a multimedia book implemented with the universal multimedia book interfacing device of this invention.

DETAILED DESCRIPTION OF THE PREFERRED EMBODIMENT

Figure 1:
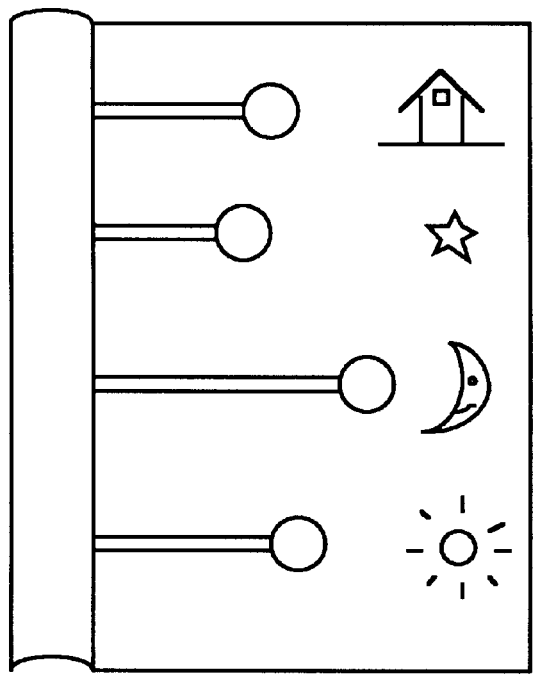
FIG. 1 is a functional block diagram showing e configuration of a conventional electronic book as currently available in the marketplace.
Figure 2:
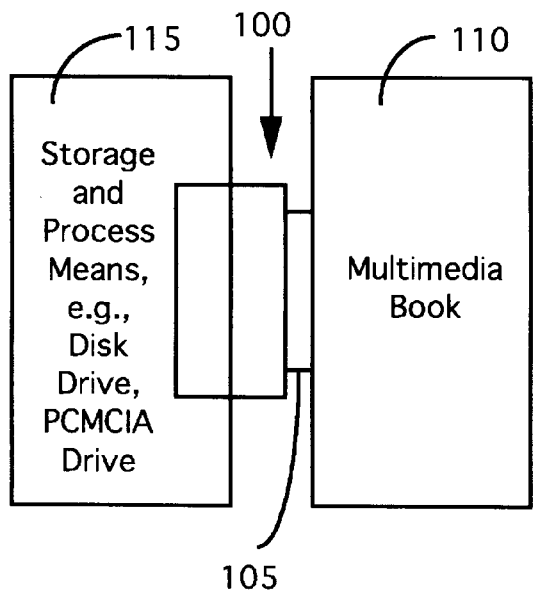
FIG. 2 is a functional block diagram of an improved configuration applying a multimedia book interfacing device of the present invention.
Figure 3:
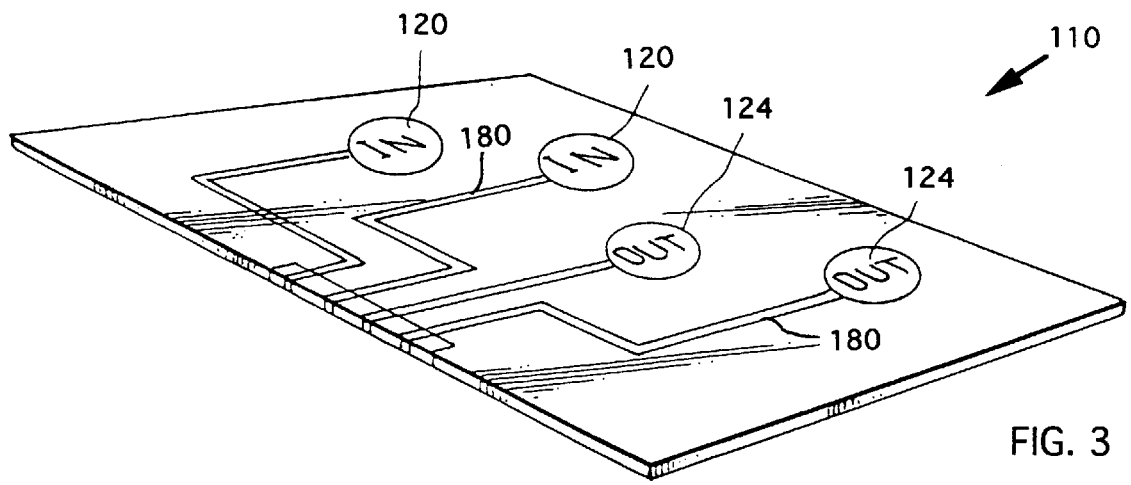
FIG. 3 is a perspective view of a page from a multimedia book of the present invention which is compatible with the universal multimedia book interfacing device disclosed in this invention.

FIG. 2 is a functional block diagram for illustrating an universal interfacing adapter 100 of the present invention. The universal interfacing adapter 100 includes a universal adapting connector 105 which includes two ends wherein the first end is connected to an multimedia book 110 and the second end is connected to an multimedia content storage and process means 115. The adapting connector 105 is an universal adapter connector to provide connection compatibility to different multimedia books 110 while the multimedia content storage and process means 115 is provided to store and process data related to a plurality of multimedia books which can be compatibly connected to the universal adapting connector 105. As shown in FIG. 3, the multimedia book 110 may include a plurality of pages and each page includes a plurality of user input areas 120 with corresponding drawing or textual descriptions printed or displayed next to the input areas 120. The page of the multimedia book 110 also includes a plurality of output means 124 for presenting multimedia output, e.g., visual display, audio announcements, etc. The output messages are multimedia data received from the multimedia content storage and process means 115 in response to the user input via the user's actions via the user input areas 120. The input areas 120 and the output means 124 are then connected to conductive strips 180 for plugging into and connecting to the universal adapting connector 105.

In a preferred embodiment, the input areas 120 disposed on each page of the multimedia book 110 are simply user push-buttons allowing a user, e.g., a child, to push buttons 120 next to a picture, e.g., a drawing of an animal, to receive from the multimedia content storage and process means 115 corresponding to the pushed button output, e.g., an audio message pronouncing the name of the pushed items. In another preferred embodiment, one of the user input areas 120 is an audio input sensor to receive an audio message from the user. The user is instructed to push a button and to verbally pronounce the item being pushed. The verbal pronouncement and the input signals generated from pushing the button 120 are then transmitted via the universal interfacing adapter 100 to the storage and process means 115. Depending on the correctness of the match between the pushed item and the verbal pronouncement, a corresponding output signal, e.g., "right" or "wrong", message is generated and transmitted to the output means 124 on the multimedia book 110 for visual display or audio announcement.

In one of the preferred embodiment, the universal interfacing adapter 100 can be standardized as a cartridge to receive different multimedia books 110. Each time a multimedia book 110 is inserted into the adapter 100, a book number is transmitted to the storage and process means 115. The storage and process means 115 verifies that the book number is valid and a special section of the memory space is allocated for the inserted multimedia book 110. As the user turns to a page, a page number is transmitted via the interfacing adapter 100 and the page number is used as an address to point specific segments of memory in the storage and process means 115 and ready to respond to different kinds user input, e.g., pushed buttons, audio messages, etc. Depending on the combination of book numbers and page numbers, the storage and process means 115 may also execute different set of commands or instructions to perform different types of processing or output activities corresponding to different user input.

Figure 4:
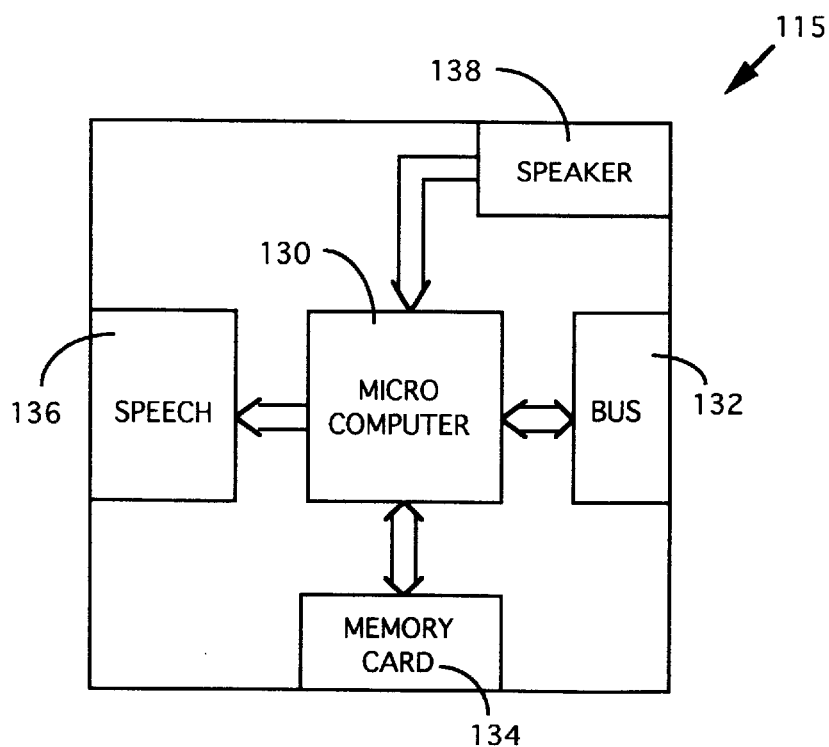
FIG. 4 is a block functional diagram of a data-storage and process device of the present invention for connecting to the multimedia book through the universal multimedia book interfacing device.

Referring to FIG. 4 for a system configuration of the multimedia content storage and process means 115 in one of the preferred embodiments. The storage and processing means 115 includes a bus controller 132 for connecting to the universal adapting connector 105 and for controlling the signal reception from and transmission to the multimedia book 110. The storage and process means 115 further includes a microprocessor 130 to control the bus controller 132 and the data storage means 134, e.g., a memory card such as a floppy disk, personal computer memory card international association (PCMCIA) card, or other data storage media. The storage and process means 115 further includes a speech data base 136 to store a plurality of verbal pronunciations and a speaker 138 for producing audio output messages.

The universal interfacing adapter 100 and the multimedia content storage and process means of the present invention provides several advantages. The first advantage is the flexibility provided by the interfacing adapter 100 to operate with different multimedia books 110. A user can flexibly insert different multimedia books into the adapter 100 without being compelled to buy a separate book-specific processor-module for each book. User flexibility is further enhanced by allowing the multimedia content storage and process means 115 to implement the data storage means 134 by employing different kinds of memory cards such as a floppy disk or a PCMCIA card. A user is further provided with the flexibility of employing different memory cards as the data storage means 134 corresponding to a varieties of multimedia books 110. The universal interfacing adapter 100 of the present invention thus allows combinations of different multimedia books 110 to interface with memory cards 134 to operate a wide varieties of multimedia books 110 without requiring changes of a book-specific electronic modules. The cost of applying the multimedia books as a tool for learning, teaching or playing can be greatly reduced. Meanwhile, the quality of the video, audio or other types of multimedia input/output signals can be greatly improved by applying a high quality storage and process means 115 because this storage and process means 115 can now be employed for operating different multimedia books 110 and a unit of higher price with better quality can therefore be justified.

In summary, this invention discloses an universal multimedia book interfacing adapter 100 for correlating a multimedia book 110 to a data storage and processing means 115. The interfacing means 100 includes a first adapting means 105 provided with connection compatibility for electrically connecting to different multimedia books 110. Each multimedia book 100 is provided with user interfaces for accepting user input signals therein and generating user output signals therefrom. The universal interfacing means 100 further includes a second adapting means provided with connection compatibility for electrically connecting to a data storage means 134 containing data relating to the multimedia books 110 wherein the universal interfacing means 100 is provided for electrically transmitting the user input signals received from one of the multimedia books 110 to pre-designated locations in the data storage means 134 for generating user output signals and for electrically transmitting the user output signals to the multimedia books 110. In one of the preferred embodiment, the first adapting means 105 is a multimedia book cartridge provided with adapting compatibility to receive different multimedia books therein 110.

Figures 5A, 5B:
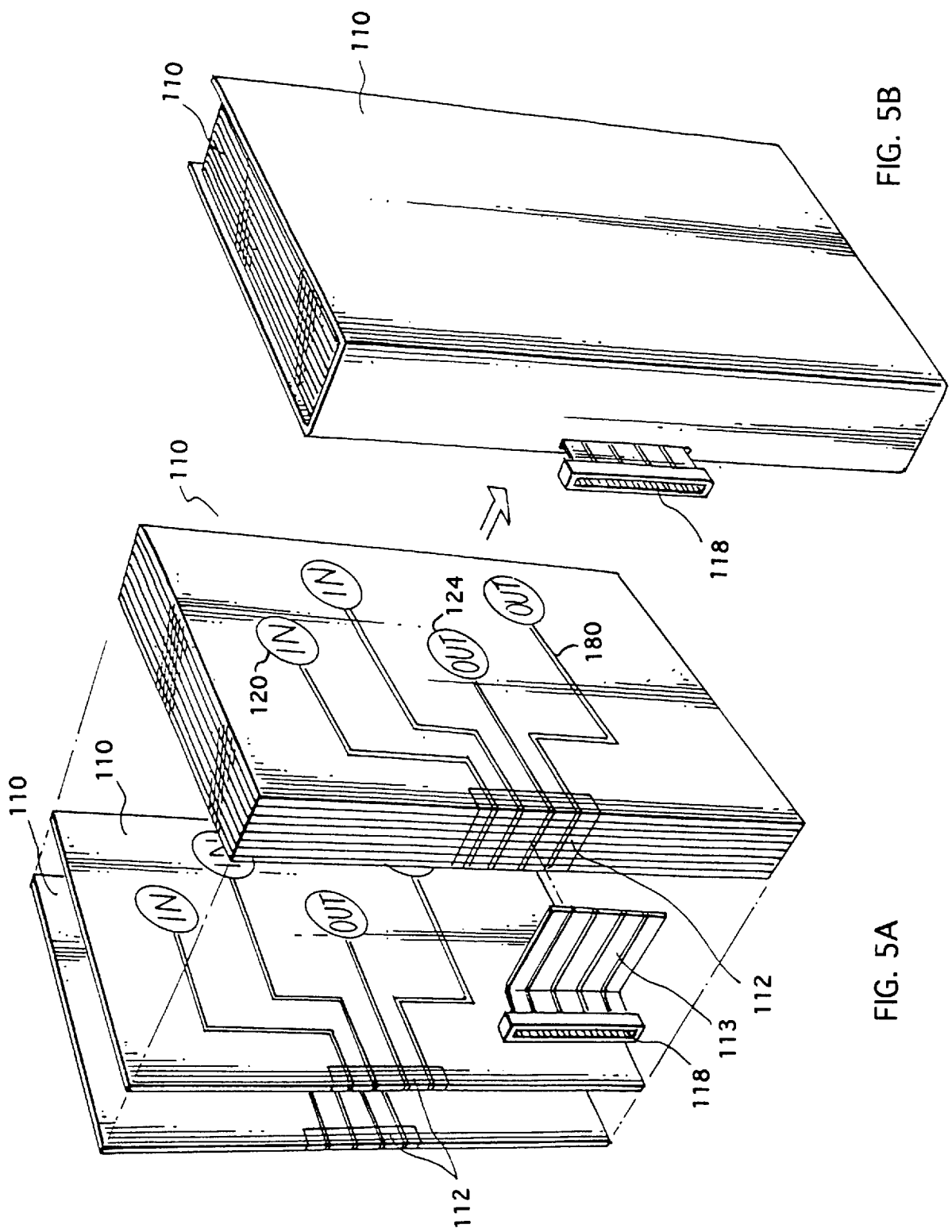

Referring to FIGS. 5A and 5B for the steps of bonding one of the multimedia books of the present invention. As shown in FIG. 5A, there are a plurality of pages containing multimedia input and output areas 120 and 124 connected to conductive strips 180. The conductive strips 180 are assembled into a data bus 112. An universal adapting connector 105 is formed at the end of the data bus 112. A simple method for connecting the multimedia book 110 to the data storage and process means 115 is to employ a flat signal cable 113 which has a connector head 118 which can be compatibly adapted to the adapting connector 105 of the multimedia book 110. The flat signal cable 113 is then connected to the data storage and process means 115 for operation with the multimedia book 110. The input areas 120 may be conventional membrane switches and the output areas 124 may be a conventional electro-luminescence (EL) material coated on the conductive strips 180 and patterned into specific shapes. The output areas 124 coated with EL material emit light when electrically charged.

Figure 6:
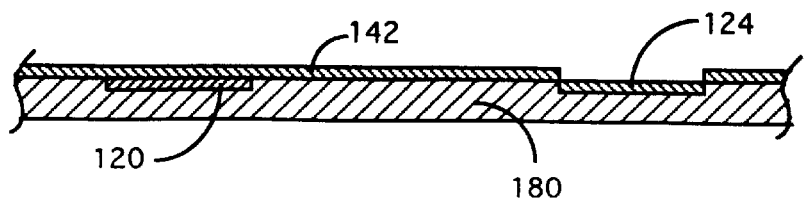
FIG. 6 is a cross sectional view of a page of a multimedia book implemented with circuit elements disposed thereon.

Referring to FIG. 6 for a cross sectional view of a page of the multimedia book employed in the present invention. There are input areas 120 and output areas 124 formed on top of the conductive strips 180. On top of the input and output areas 120 and 124, a top membrane 142 is formed to protect the input areas 125, the output areas 124, and the conductive strips 180. Illustrations such as drawings of items related to the input and out areas are can be printed on the membrane layer 142 to provide indications for user's input and output.

Additionally, a method for providing universal multimedia-book interface for operation with a multimedia book is disclosed in is invention. The method including the steps of: (a) providing a first adapting means 105 with connection compatibility for electrically connecting to different multimedia books 110, each provided with user interfaces 120 and 124 for accepting user input signals therein and delivering user output signals therefrom; (b) providing a second adapting means 115 with connection compatibility for electrically connecting to a data storage means 134 containing data relating to the multimedia books; and (c) electrically transmitting the user input signals received from one of the multimedia books 110 to pre-designated locations in the data storage means 134 for generating user output signals and electrically transmitting the user output signals to the multimedia books 110. In one of the preferred embodiments, the step of providing to first adapting means 105 is a step of providing a multimedia book cartridge with adapting compatibility to receive different multimedia books 110 wherein.

Therefore, an improved system configuration and interfacing method for adapting a multimedia book to a data-processing module is disclosed in this invention. More user selections and interfacing flexibility are allowed such that the difficulties and limitations in the prior art are overcome. Specifically, an improved system configuration and interfacing method for adapting a multimedia book to a data-processing module are provided by this invention wherein an universal multimedia book adapting module is employed which allows different multimedia books to be adapted thereon thus the limitations caused by a book-specific electronic module are now resolved. Furthermore, the data-processing module is provided to employ a varieties of data-storage media to store data therein corresponding to different sets of multimedia books thus allowing broader spectrum of multimedia books to be selected by a user without being limited by a book-specific electronic module of the prior art. The cost of employing this multimedia book system for learning enhancement can be reduced because a single system can now be applied to different multimedia books. In addition, the quality and performance of such systems can be improved because a single system can now be applied to different multimedia books and therefore a higher-price higher-quality unit is acceptable to the market because of the higher level of utilities which is now available by employing the universal adapting interfacing module of the present invention.

Although the present invention has been described in terms of the presently preferred embodiment, it is to be understood hat such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. An universal multimedia-book interfacing means for operation with a multimedia book, said interfacing means comprising:

a first adapting means provided with connection compatibility for electrically connecting to different removable multimedia books, each having a multimedia page provided with page-unique user interfaces for accepting user input signals therein and delivering user output signals therefrom; and a second adapting means provided with connection compatibility for electrically connecting to a data storage means containing data relating to said multimedia books wherein said universal interfacing means is provided for electrically transmitting said user input signals received from said multimedia page of said multimedia books to pre-designated locations in said data storage means for generating corresponding page-unique user output signals and for electrically transmitting said user output signals to said multimedia books.

2. The universal multimedia book interfacing means of claim 1 wherein:

said first adapting means is a multimedia book cartridge provided with adapting compatibility to receive different removable multimedia books therein.

3. The universal multimedia book interfacing means of claim 1 wherein:

said second adapting means further includes a data bus controller for controlling data transmissions between said removable multimedia book and said data storage means.

4. The universal multimedia book interfacing means of claim 3 wherein:

said second adapting means further includes a microprocessor for controlling said data bus controller and said data storage means.

5. The universal multimedia book interfacing means of claim 4 wherein:

said second adapting means further includes a speech database for storing a plurality of speech data for operation with said multimedia page of said removable multimedia book.

6. The universal multimedia book interfacing means of claim 4 wherein:

said second adapting means further includes a speaker for pronouncing an audio output for operation with said multimedia page of said removable multimedia book.

7. The universal multimedia book interfacing means of claim 4 wherein:

said second adapting means further includes a data reading means for reading data from a removable data storage means for operation with said multimedia page of said removable multimedia book.

8. The universal multimedia book interfacing means of claim 7 wherein:

said data reading means is a disk drive for reading data from a removable disk with data stored therein for operation with said multimedia page of said removable multimedia book.

9. An universal multimedia-book interfacing means for operation with a multimedia book, said interfacing means comprising:

a multimedia book cartridge provided with adapting compatibility to receive different removable multimedia books therein, wherein each of said multimedia books having at least one multimedia page having page unique user interfaces for accepting user input signals therein and delivering user output signals therefrom;

a second adapting means provided with connection compatibility for electrically connecting to a data storage means containing data relating to said multimedia page of one of said multimedia books wherein said universal interfacing means is provided for electrically transmitting said user input signals received from said multimedia book to pre-designated locations in said data storage means for generating corresponding page-unique user output signals and for electrically transmitting said user output signals to said multimedia books;

said second adapting means further includes a data bus controller for controlling data transmissions between said multimedia book and said data storage means;

said second adapting means further includes a microprocessor for controlling said data bus controller and said data storage means;

said second adapting means further includes a speech database for storing a plurality of speech data for operation with said multimedia book;

said second adapting means further includes a speaker for pronouncing an audio output for operation with said multimedia page of said removable multimedia book.

10. The universal multimedia book interfacing means of claim 9 wherein:

said second adapting means further includes a data reading means for reading data from a removable data storage means for operation with said multimedia page of said removable multimedia book.

11. The universal multimedia book interfacing means of claim 10 wherein:

said data reading means is a disk drive for reading data from a removable disk with data stored therein for operation with said multimedia page of said removable multimedia book.

12. The universal multimedia book interfacing means of claim 10 wherein:

said data reading means is a personal computer memory card international association (PCMCIA) drive for reading data from a removable PCMCIA card with data stored therein for operation with said multimedia page of said removable multimedia book.

13. An universal multimedia book interfacing means for operation with a multimedia book, said interfacing means comprising:

a first adapting means provided with connection compatibility for electrically connecting to different removable multimedia books, each having a multimedia page provided with page-unique user interfaces for accepting user input signals therein and delivering user output signals therefrom; and a second adapting means provided with connection compatibility for electrically connecting to a removable data storage means containing data relating uniquely to said multimedia page of said removable multimedia books wherein said universal interfacing means is provided for electrically transmitting said user input signals received from said multimedia page of said multimedia books to pre-designated locations in said data storage means for generating corresponding page-unique user output signals and for electrically transmitting said user output signals to said multimedia books.

14. A method for providing universal multimedia-book interface for operation with a multimedia book, said method comprising:

providing a first adapting means with connection compatibility for electrically connecting to different removable multimedia books, each having a multimedia page provided with page-unique user interfaces for accepting user input signals therein and delivering user output signals therefrom;

providing a second adapting means with connection compatibility for electrically connecting to a removable data storage means containing data relating uniquely to said multimedia page of said removable multimedia books; and electrically transmitting said user input signals received from said multimedia page of one of said multimedia books to pre-designated locations in said data storage means for generating page-unique user output signals and electrically transmitting said user output signals to said multimedia books.

15. The method of providing universal multimedia book interface of claim 14 wherein:

said step of providing said first adapting means is a step of providing a multimedia book cartridge with adapting compatibility to receive different removable multimedia books therein.

16. The method of providing universal multimedia book interface of claim 14 wherein:

said step of providing said second adapting means further includes a step of providing a data bus controller for controlling data transmissions between said removable multimedia book and said removable data storage means.

17. The method of providing universal multimedia book interface of claim 14 wherein:

said step of providing said second adapting means further includes a step of providing a microprocessor for controlling said data bus controller and said removable data storage means.

18. The method of providing universal multimedia book interface of claim 17 wherein:

said step of providing said second adapting means further includes a step of providing a speech database for storing a plurality of speech data for operation with said multimedia page of said removable multimedia book.

19. The method of providing universal multimedia book interface of claim 17 wherein:

said step of providing said second adapting means further includes a step of providing a speaker for pronouncing an audio output for operation with said multimedia page of said removable multimedia book.

20. The method of providing universal multimedia book interface of claim 17 wherein:

said step of providing said second adapting means further includes a step of providing a data reading means for reading data from a removable data storage means for operation with said multimedia page of said removable multimedia book.

21. The method of providing universal multimedia book interface of claim 20 wherein:

said step of providing said data reading means is a step of providing a disk drive for reading data from a removable disk with data stored therein for operation with said multimedia page of said removable multimedia book.

22. The method of providing universal multimedia book interface of claim 20 wherein:

said step of providing said data reading means is a step of providing a PCMCIA drive for reading data from a PCMCIA card with data stored therein for operation with said multimedia page of said removable multimedia book.

* * * * *